US012703204B2

(12) United States Patent
Noritake

(10) Patent No.: US 12,703,204 B2
(45) Date of Patent: Aug. 11, 2026

(54) TIRE

(71) Applicant: The Yokohama Rubber Co., LTD., Kanagawa (JP)

(72) Inventor: Masashi Noritake, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 19/008,988

(22) Filed: Jan. 3, 2025

(65) Prior Publication Data

US 2025/0222722 A1 Jul. 10, 2025

(30) Foreign Application Priority Data

Jan. 9, 2024 (JP) ................................ 2024-001031
Oct. 15, 2024 (JP) ................................ 2024-179631

(51) Int. Cl.

| | |
|---|---|
| ***B60C 9/20*** | (2006.01) |
| ***B60C 9/22*** | (2006.01) |
| ***B60C 9/28*** | (2006.01) |
| ***B60C 11/03*** | (2006.01) |

(52) U.S. Cl.

CPC .............. *B60C 9/20* (2013.01); *B60C 9/2204* (2013.01); *B60C 9/28* (2013.01); *B60C 11/03* (2013.01); *B60C 2009/2019* (2013.01); *B60C 2009/2074* (2013.01); *B60C 2011/0339* (2013.01)

(58) Field of Classification Search

CPC ............................... B60C 9/20; B60C 9/2006; B60C 9/22; B60C 9/2204; B60C 2009/2019

See application file for complete search history.

(56) References Cited

U.S. PATENT DOCUMENTS 5,738,740 A * 4/1998 Cluzel ....................... B60C 9/28 152/526
2015/0101727 A1* 4/2015 Hamanaka ............ B60C 11/005 152/535
2016/0068023 A1* 3/2016 Kunugi ............... B60C 11/0083 152/209.15

FOREIGN PATENT DOCUMENTS

JP 5525073 B1 6/2014

* cited by examiner

*Primary Examiner* — Robert C Dye
(74) *Attorney, Agent, or Firm* — Thorpe North & Western, LLP

(57) ABSTRACT

A belt layer includes an inner cross belt having a belt cord angle with an absolute value of 45 degrees or more relative to the circumferential direction, an outer cross belt having a belt cord angle with an absolute value of 45 degrees or less relative to the circumferential direction with an opposite sign as the belt cord angle of the inner cross belt and outward of the inner cross belt in the radial direction, and a circumferential reinforcing layer including a belt cord having a belt angle within ±5 degrees relative to the circumferential direction and disposed between the inner and outer cross belts. A width W1 of the circumferential reinforcing layer in the width direction, a width W2 of the inner cross belt in the width direction, and a width W3 of the outer cross belt in the width direction satisfy a relationship W1<W3<W2.

10 Claims, 6 Drawing Sheets

| CONTENT | SPECIFIED RANGE | CONVENTIONAL EXAMPLE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|---|---|
| RADIALLY OUTER CROSS BELT | 45 DEGREES OR LESS | 20 | 20 | 50 | 20 | 20 | 20 | 20 |
| CIRCUMFERENTIAL REINFORCING LAYER | PRESENCE | YES | NO | YES | YES | YES | YES | YES |
| RADIALLY INNER CROSS BELT | 45 DEGREES OR MORE | 20 | 20 | 50 | 50 | 50 | 50 | 50 |
| RELATIONSHIP BETWEEN W1, W2, W3 | W1 < W3 < W2 | W1 < W3 < W2 | - | W1 < W3 < W2 | W1 < W2 < W3 | W1 < W3 < W2 | W1 < W3 < W2 | W1 < W3 < W2 |
| SUPPLEMENTAL BELT | PRESENCE | YES | YES | YES | YES | YES | YES | YES |
| W3/W4 | LESS THAN 90% | LESS THAN 90% | LESS THAN 90% | LESS THAN 90% | 90% OR MORE | 90% OR MORE | LESS THAN 90% | LESS THAN 90% |
| W1/Wp | 50% OR MORE AND 70% OR LESS | 50 | - | 50 | 50 | 50 | 50 | 56 |
| W1/W2 | 65% OR MORE AND 80% OR LESS | 70 | - | 70 | 70 | 70 | 70 | 70 |
| W2-W3 | 30 mm OR LESS | 20 | 20 | 20 | 20 | 20 | 20 | 20 |
| LARGE-ANGLE BELT | PRESENCE | YES | YES | YES | YES | YES | YES | YES |
| D/d | 1.3 > D/d > 0.8 | 0.8 | 0.7 | 0.8 | 0.8 | 0.8 | 0.8 | 0.8 |
| Wt/Wp | 60% OR MORE AND 95% OR LESS | 65 | 65 | 65 | 65 | 65 | 65 | 65 |
| BELT LAYER | THREE BELT PLIES | 5 | 5 | 5 | 5 | 5 | 5 | 5 |
| TREAD WIDTH Wt | 300 mm OR LESS | 300 | 300 | 300 | 300 | 300 | 300 | 300 |
| FUEL ECONOMY PERFORMANCE | | 100 | 90 | 110 | 105 | 105 | 103 | 103 |
| DURABILITY PERFORMANCE | | 100 | 90 | 90 | 95 | 100 | 100 | 103 |

FIG. 5

| CONTENT | SPECIFIED RANGE | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|
| RADIALLY OUTER CROSS BELT | 45 DEGREES OR LESS | 20 | 20 | 20 | 20 | 20 | 20 | 20 |
| CIRCUMFERENTIAL REINFORCING LAYER | PRESENCE | YES | YES | YES | YES | YES | YES | YES |
| RADIALLY INNER CROSS BELT | 45 DEGREES OR MORE | 50 | 50 | 50 | 50 | 50 | 50 | 50 |
| RELATIONSHIP BETWEEN W1, W2, AND W3 | W1 < W3 < W2 | W1 < W3 < W2 | W1 < W3 < W2 | W1 < W3 < W2 | W1 < W3 < W2 | W1 < W3 < W2 | W1 < W3 < W2 | W1 < W3 < W2 |
| SUPPLEMENTAL BELT | PRESENCE | YES | NO | YES | YES | YES | NO | NO |
| W3/W4 | LESS THAN 90% | LESS THAN 90% | LESS THAN 90% | LESS THAN 90% | LESS THAN 90% | LESS THAN 90% | LESS THAN 90% | LESS THAN 90% |
| W1/Wp | 50% OR MORE AND 70% OR LESS | 56 | 56 | 56 | 56 | 56 | 56 | 56 |
| W1/W2 | 65% OR MORE AND 80% OR LESS | 73 | 73 | 73 | 73 | 73 | 73 | 73 |
| W2 - W3 | 30 mm OR LESS | 15 | 15 | 15 | 15 | 15 | 15 | 15 |
| LARGE-ANGLE BELT | PRESENCE | YES | YES | NO | NO | NO | NO | NO |
| D/d | 1.3 > D/d > 0.8 | 0.8 | 0.8 | 0.8 | 1.0 | 1.0 | 1.0 | 1.0 |
| Wt/Wp | 60% OR MORE AND 95% OR LESS | 65 | 65 | 65 | 65 | 75 | 75 | 75 |
| BELT LAYER | THREE BELT PLIES | 5 | 4 | 4 | 4 | 4 | 3 | 3 |
| TREAD WIDTH Wt | 300 mm OR LESS | 300 | 300 | 300 | 300 | 300 | 300 | 450 |
| FUEL ECONOMY PERFORMANCE | | 103 | 108 | 110 | 113 | 115 | 120 | 120 |
| DURABILITY PERFORMANCE | | 107 | 110 | 110 | 112 | 115 | 120 | 115 |

FIG. 6

TIRE

CROSS-REFERENCE TO RELATED APPLICATIONS

This application claims priority pursuant to 35 U.S.C. 119(a) to Japanese Patent Application No. 2024-001031, filed Jan. 9, 2024, and Japanese Patent Application No. 2024-179631, filed Oct. 15, 2024, the entire contents of which are incorporated herein by reference.

TECHNICAL FIELD

The technology relates to a tire.

BACKGROUND ART

For example, Japan Patent No. 5525073 B describes a heavy duty tire that reduces wear of a shoulder edge while maintaining durability of a plunger. The heavy duty tire includes a first belt layer composed of cords extending at an angle greater than 45 degrees with respect to a tire circumferential direction, a second belt layer composed of cords extending in the tire circumferential direction, and a third belt layer composed of cords extending in a direction opposite to the cords of the first belt layer at an angle of 30 degrees or less with respect to the tire circumferential direction sequentially disposed from an inner side in a tire radial direction. A width W3 of the third belt layer is set to 80% or more of a tread width W, a width of the first belt layer is W1, a width of the second belt layer is W2, and W2<W1<W3 is satisfied.

Here, to promote improving fuel efficiency in response to recent environmental regulations, reduction in rolling resistance has been awaited. For this reason, reducing the rolling resistance through a belt structure of a tire can be considered, but there is a concern about a decrease in durability.

SUMMARY

The technology provides a tire that can provide fuel economy performance and durability performance in a compatible manner through a belt structure.

A tire according to an aspect of the present technology includes: a carcass layer; a belt layer disposed on an outer side of the carcass layer in a tire radial direction and continuous in a tire circumferential direction; a tread rubber disposed on an outer side of the belt layer in the tire radial direction; at least two circumferential main grooves extending in the tire circumferential direction in the tread rubber; and a plurality of land portions defined by the circumferential main grooves in the tread rubber. The belt layer includes a radially inner cross belt including a belt cord having a belt angle having an absolute value of 45 degrees or more with respect to the tire circumferential direction, a radially outer cross belt including a belt cord having a belt angle having an absolute value of 45 degrees or less with respect to the tire circumferential direction with a sign opposite to a sign of the belt angle of the radially inner cross belt and disposed on an outer side of the radially inner cross belt in the tire radial direction, and a circumferential reinforcing layer including a belt cord having a belt angle within a range of ±5 degrees with respect to the tire circumferential direction and disposed between the radially inner cross belt and the radially outer cross belt. A width W1 of the circumferential reinforcing layer, a width W2 of the radially inner cross belt, and a width W3 of the radially outer cross belt satisfy a relationship W1<W3<W2.

An aspect of the technology can provide fuel economy performance and durability performance in a compatible manner.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 5 is a table showing results of performance tests of pneumatic tires according to embodiments.

FIG. 6 is a table showing results of performance tests of pneumatic tires according to embodiments.

DETAILED DESCRIPTION

The embodiment according to the present technology will be described in detail below with reference to the drawings. However, the technology is not limited to the embodiment. Constituents of the embodiments include elements that are substitutable while maintaining consistency with the technology, and obviously substitutable elements. The plurality of modified examples described in the embodiments can be combined as desired within the scope apparent to one skilled in the art.

In the following description, the term "tire radial direction" refers to a direction orthogonal to the tire rotation axis (not illustrated), which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction of the embodiment. The term "tire circumferential direction" refers to a circumferential direction with the tire rotation axis as a center axis. The term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. "Tire equator line" refers to a line in the tire circumferential direction of the pneumatic tire 1 that lies on the tire equatorial plane CL. The term "cross-section in the tire meridian direction (meridian cross-sectional view)" refers to a cross section of the tire taken along a plane that includes the tire rotation axis.

Figure 1:
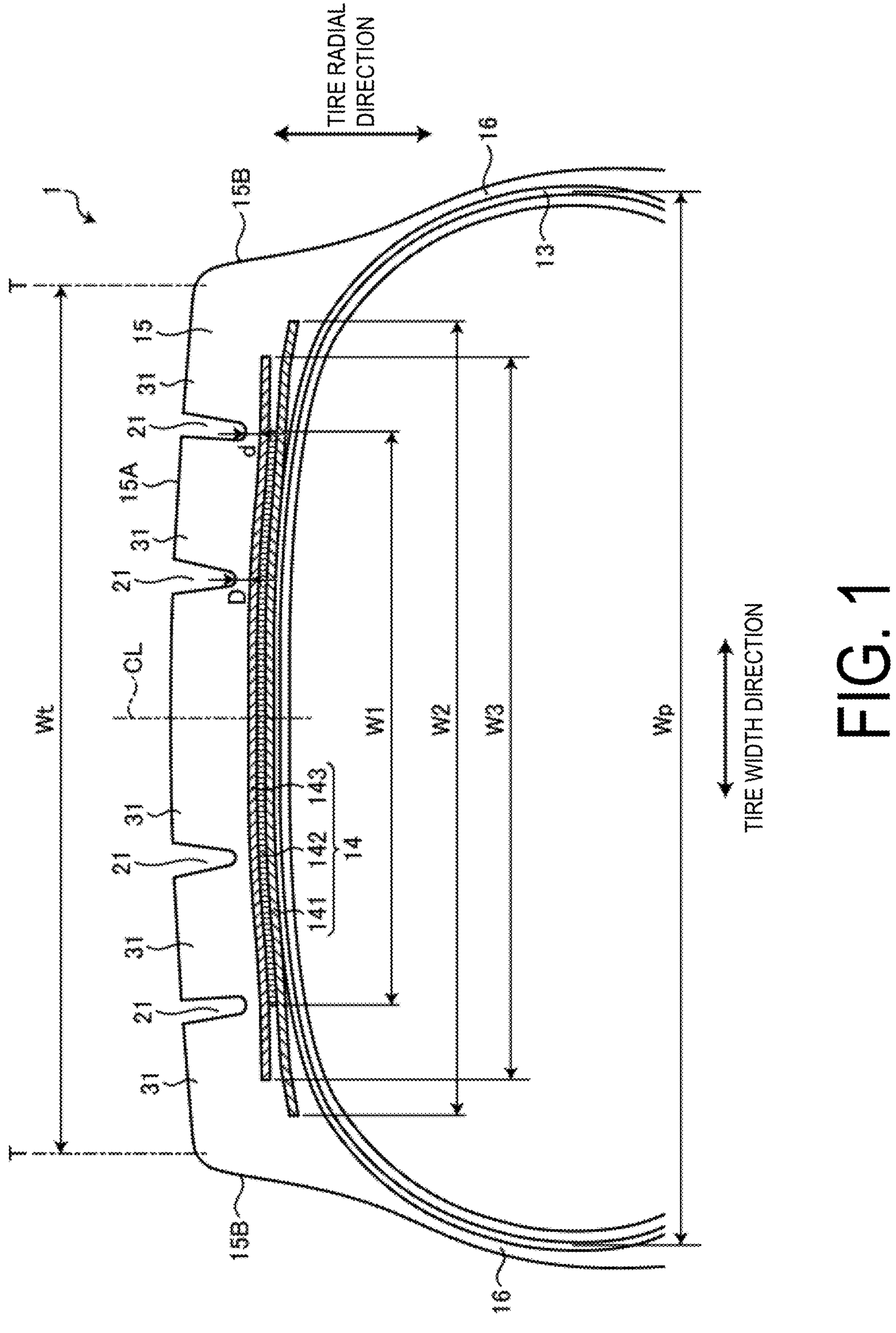
FIG. 1 is a meridian cross-sectional view of a pneumatic tire according to an embodiment.

FIG. 1 is a meridian cross-section of a pneumatic tire 1 of the embodiment and illustrates a cross-section of a region on one side of the tire rotation axis in the tire radial direction. In the present embodiment, a heavy duty pneumatic radial tire mounted on a heavy-load vehicle, such as a truck or bus, will be described as an example. The pneumatic tire 1 of the present embodiment is particularly appropriate for use as an all-season tire.

The pneumatic tire 1 of the embodiment has an annular structure with the tire rotation axis as its center, and although not illustrated in the figure, includes a pair of bead cores, a pair of bead fillers, and a pair of rim cushion rubbers, and as illustrated in FIG. 1, a carcass layer 13, a belt layer 14, a tread rubber 15, and a pair of sidewall rubbers 16, 16.

The pair of bead cores include one or more bead wires made of steel and made by being wound annularly multiple times, are embedded in bead portions, and constitute cores of bead portions on both sides in the tire width direction. The pair of bead fillers are respectively disposed on an outer side in the tire radial direction and reinforce the bead portions of the pair of bead cores. The pair of rim cushion rubbers extend from an inner side in the tire radial direction of the respective bead cores and turned back portions of the carcass layer 13 toward the outer side in the tire width direction, and constitute rim fitting surfaces of the bead portions.

The carcass layer 13 has a single-layer structure including one carcass ply or a multilayer structure including a plurality of carcass plies layered. The carcass layer 13 extends between both bead cores in a toroidal shape, forming the framework of the tire. Both end portions of the carcass layer 13 are turned back toward outer sides in the tire width direction and fixed to wrap the bead cores and the bead fillers. The carcass ply of the carcass layer 13 is formed by covering a plurality of carcass cords made of steel with a rubber coating and performing a rolling process thereon. The carcass ply of the carcass layer 13 has a cord angle (defined as the inclination angle in the longitudinal direction of the carcass cords with respect to the tire circumferential direction) of 80 degrees or more and 100 degrees or less for radial tires and 30 degrees or more and 45 degrees or less for bias tires as absolute values.

The belt layer 14 includes at least three belt plies 141 to 143 in a multilayer, and is disposed continuously in the tire circumferential direction by being wound up on the outer circumference of the carcass layer 13. These belt plies 141 to 143 include a radially inner cross belt 141, a radially outer cross belt 142, and a circumferential reinforcing layer 143.

Figure 2:
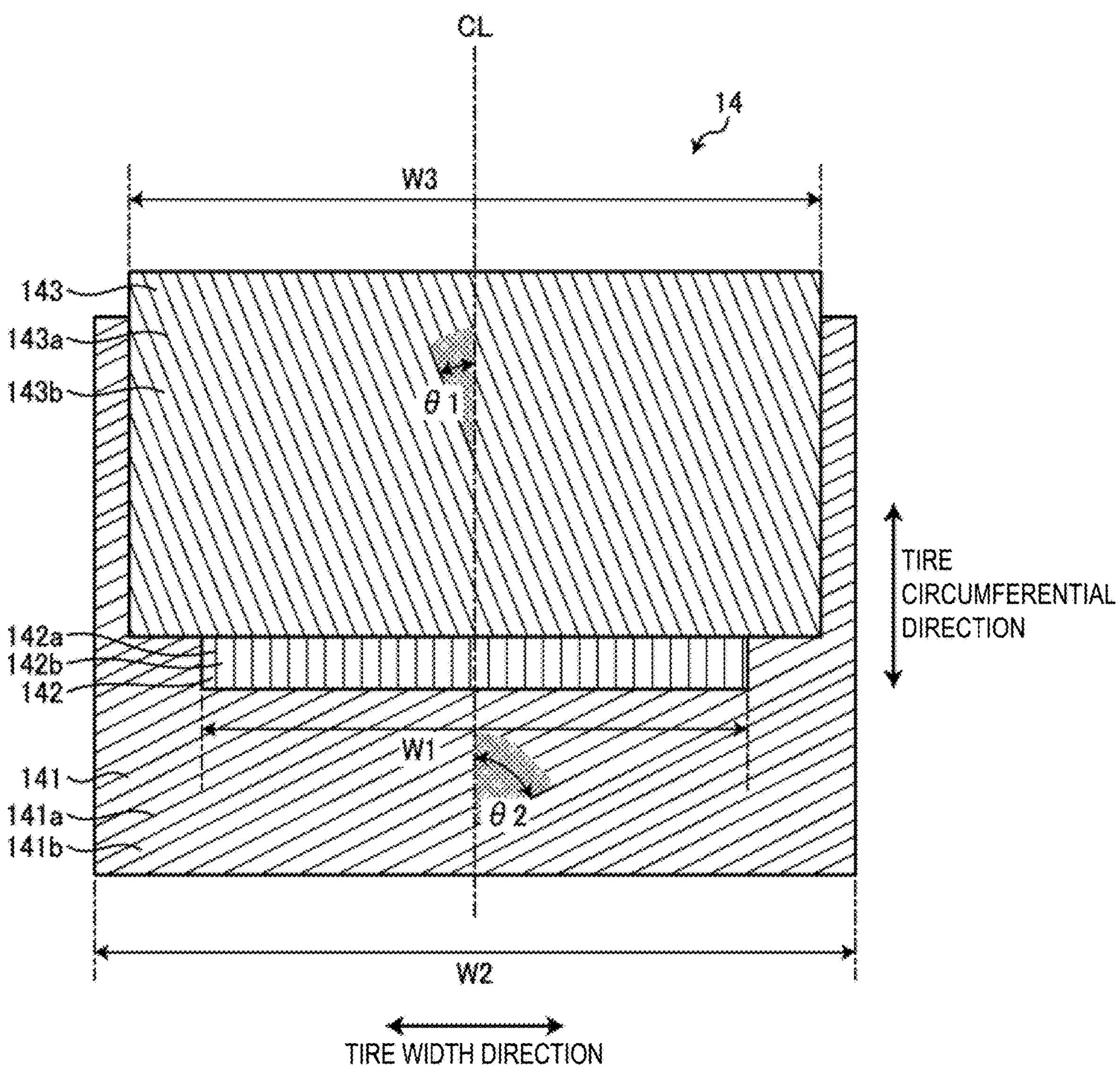
FIG. 2 is a development view of a belt layer of the pneumatic tire according to an embodiment.

The radially inner cross belt 141 is disposed on the inner side in the tire radial direction among the three belt plies. As illustrated in FIG. 2, the radially inner cross belt 141 is constituted by covering, with coating rubber 141*b*, a plurality of belt cords 141*a* made of steel and by performing a rolling process on the belt cords. In the radially inner cross belt 141, the belt cord 141*a* has a belt angle θ2 of 45 degrees or more with respect to the tire circumferential direction as an absolute value.

The radially outer cross belt 143 is disposed on the outer side in the tire radial direction among the three belt plies. As illustrated in FIG. 2, the radially outer cross belt 143 is constituted by covering, with coating rubber 143*b*, a plurality of belt cords 143*a* made of steel and by performing a rolling process on the belt cords. In the radially outer cross belt 143, the belt cord 143*a* has a belt angle θ1 of 45 degrees or less with respect to the tire circumferential direction as an absolute value with an opposite sign to that of the radially inner cross belt 141.

The circumferential reinforcing layer 142 is disposed between the radially inner cross belt 141 and the radially outer cross belt 143 among the three belt plies. As illustrated in FIG. 2, the circumferential reinforcing layer 142 is constituted by covering, with coating rubber 142*b*, a plurality of belt cords 142*a* made of steel and by performing a rolling process on the belt cords. In the circumferential reinforcing layer 142, the belt cord 142*a* has a belt angle within a range of ±5 degrees with respect to the tire circumferential direction as an absolute value.

As illustrated in FIG. 1, the tread rubber 15 is disposed on the outer side of the carcass layer 13 and the belt layer 14 in the tire radial direction and constitutes a tread portion of the pneumatic tire 1. The tread rubber 15 includes a tread surface (tread contact surface) 15A on an outer circumferential surface that comes into contact with a road contact surface during travel. An end portion of the tread surface 15A on the outer side in the tire lateral direction is a ground contact edge T. The tread rubber 15 includes a buttress portion 15B, which does not come into contact with a road surface during travel, on a side portion on both outer sides in the tire width direction from the ground contact edge T on the tread surface 15A. The buttress portion 15B is provided in tread rubber 15 from the ground contact edge T to the outer side in the tire width direction and the inner side of the tire radial direction, up to the sidewall rubber 16. The buttress portion 15B is formed in a trapezoidal shape whose dimension in the tire width direction increases from the outer side in the tire radial direction to the inner side in the tire radial direction.

The ground contact edge T is defined as a maximum width position in the tire axial direction of the contact surface between the tire and a flat plate when the tire is mounted on a specified rim, inflated to a specified internal pressure in an unloaded state (inflated state), placed perpendicular to the flat plate in a static state, and loaded with a load corresponding to a specified load.

"Specified rim" refers to a "standard rim" defined by JATMA (the Japan Automobile Tyre Manufacturers Association, Inc.), a "Design Rim" defined by the Tire and Rim Association, Inc. (TRA), or a "Measuring Rim" defined by the European Tyre and Rim Technical Organisation (ETRTO). "Specified internal pressure" refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. A specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. In the case of the pneumatic tire 1 according to the embodiment, the specified load is 88% of the maximum load capacity at the specified internal pressure.

The pair of sidewall rubbers 16, 16 are each disposed on an outer side of the carcass layer 13 in the tire width direction and constitute sidewall portions on both sides in the tire width direction.

As illustrated in FIG. 1, the pneumatic tire 1 according to the embodiment includes, on the tread surface 15A, a circumferential main groove 21 extending in the tire circumferential direction and a plurality of land portions 31 defined by the circumferential main groove 21.

The circumferential main groove 21 is provided to extend in the tire circumferential direction and has an annular structure that extends continuously and linearly along the entire circumference of the tire. The circumferential main groove 21 is defined as a groove having a wear indicator as specified by JATMA mandatorily provided. The circumferential main groove 21 has a groove width of 5 mm or more and 20 mm or less and a groove depth of 7 mm or more and 30 mm or less.

The groove width is measured as a maximum value of a distance between opposed groove walls or edges of an opening end portion on the tread surface 15A when the tire is mounted on a specified rim, inflated to a specified internal pressure, and in an unloaded state.

The groove depth is measured as the maximum value of a distance from the tread surface 15A to the groove bottom when the tire is mounted on a specified rim, inflated to a specified internal pressure, and in an unloaded state. In a configuration in which a groove bottom includes partial recess/protrusion portions or a sipe, the groove depth is measured excluding the partial recess/protrusion portions or the sipe.

Figure 3:
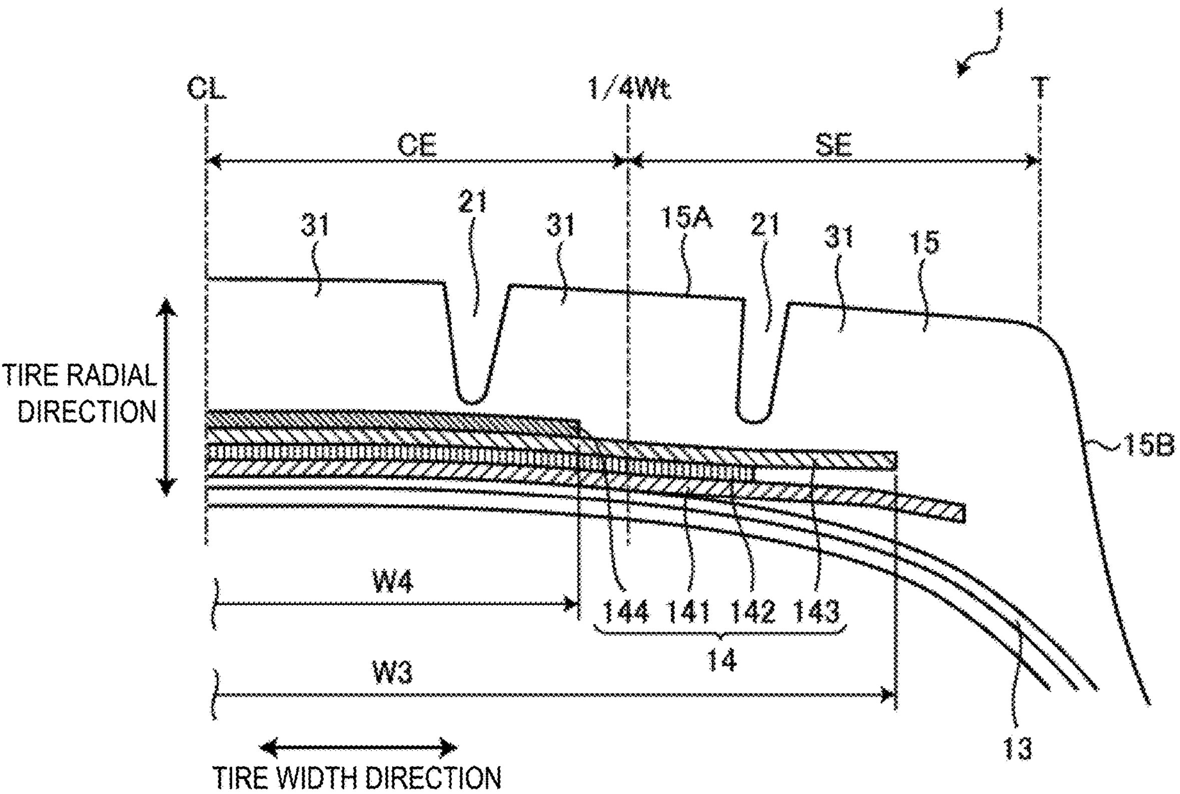
FIG. 3 is a meridian cross-sectional view of another configuration of the pneumatic tire according to an embodiment.

As illustrated in FIG. 3, in the pneumatic tire 1 according to the embodiment, the circumferential main groove 21 includes a groove disposed in a center region CE of the tread surface 15A and a groove disposed within a shoulder region SE of the tread surface 15A. In the embodiment, the circumferential main groove 21 is disposed in each center region CE with the tire equatorial plane CL as a boundary, and in each shoulder region SE with the tire equatorial plane CL as a boundary.

The center region CE is a region within a range of one quarter (¼ Wt) from the tire equatorial plane CL to both outer sides in the tire width direction, with respect to a tread width Wt (the dimension measured when the tire is mounted on a specified rim, inflated to a specified internal pressure in an unloaded state) of the tread surface 15A between the both ground contact edges T. The shoulder region SE is a region within a range of one quarter (¼ Wt) from each ground contact edges T to both inner sides in the tire width direction, with respect to the tread width Wt (the dimension measured when the tire is mounted on a specified rim, inflated to a specified internal pressure in an unloaded state) of the tread surface 15A between the both ground contact edges T.

The land portions 31 extend over the entire circumference of the tire and form an annular road contact surface (ground contact surface). The land portions 31 include a center land portion disposed in the center region CE, a middle land portion extending over the center region CE and the shoulder region SE, and a shoulder land portion disposed on an outermost side in the tire width direction in the shoulder region SE.

The pneumatic tire 1 according to the embodiment is configured such that, with respect to the tire equatorial plane CL, one side and the other side on the outer side in the tire width direction are symmetrical.

The pneumatic tire 1 according to the embodiment includes the carcass layer 13, the belt layer 14 disposed on an outer side of the carcass layer 13 in the tire radial direction and continuous in the tire circumferential direction, the tread rubber 15 disposed on the outer side of the belt layer 14 in the tire radial direction, at least two circumferential main grooves 21 extending in the tire circumferential direction in the tread rubber 15, and the plurality of land portions 31 defined by the circumferential main grooves 21 in the tread rubber 15. Then, the belt layer 14 includes the radially inner cross belt 141 including the belt cord 141*a* having a belt angle having an absolute value of 45 degrees or more with respect to the tire circumferential direction, the radially outer cross belt 143 including the belt cord 143*a* having a belt angle having an absolute value of 45 degrees or less with respect to the tire circumferential direction with a sign opposite to a sign of the belt angle of the radially inner cross belt 141 and disposed on an outer side of the radially inner cross belt 141 in the tire radial direction, and the circumferential reinforcing layer 142 including the belt cord 142*a* having a belt angle within a range of ±5 degrees with respect to the tire circumferential direction and disposed between the radially inner cross belt 141 and the radially outer cross belt 143, and as illustrated in FIG. 1. A width W1 of the circumferential reinforcing layer 142, a width W2 of the radially inner cross belt 141, and a width W3 of the radially outer cross belt 143 satisfy a relationship W1<W3<W2.

In the pneumatic tire 1, the radially inner cross belt 141 functions as a belt ply including the belt cords 141*a* with relatively high angle to ensure rigidity in the tire width direction. According to the pneumatic tire 1, the circumferential reinforcing layer 142 and the radially outer cross belt 143 function as belt plies including the belt cords 142*a*, 143*a* with relatively low angle to ensure rigidity in the tire circumferential direction. Accordingly, in the pneumatic tire 1, a rigidity balance between the tire width direction and the tire circumferential direction is properly set and rolling resistance is lowered, resulting in improved fuel economy performance. Further, in the pneumatic tire 1, satisfying the relationship W1<W3<W2 allows, in the radially inner cross belt 141 and the radially outer cross belt 143 disposed as the cross belts, a rubber layer that has the width W2 of the radially inner cross belt 141 greater than the width W3 of the radially outer cross belt 143 and is sufficient in accordance with the trapezoidal outer shell profile of the buttress portion 15B to be ensured, thus improving tire durability performance in terms of belt separation as a dimension along the tire width direction.

In the pneumatic tire 1 according to the embodiment, the circumferential main groove 21 is in the center region CE of the tread surface 15A, and as illustrated in FIG. 3, a supplemental belt 144 is provided on the outer side of the radially outer cross belt 143 in the tire radial direction, and a width W4 of the supplemental belt 144 has a range including a position of the circumferential main groove 21 in the center region CE and is less than 90% of the width W3 of the radially outer cross belt 143.

The supplemental belt 144 is disposed on the outer side of the radially outer cross belt 143 in the tire radial direction, in addition to the above-described three belt plies of the belt layer 14. The supplemental belt 144 is constituted by covering, with coating rubber, a plurality of belt cords made of steel and by performing a rolling process on the belt cords. In the supplemental belt 144, the belt cord has a belt angle that is the same sign as that of the radially outer cross belt 143 and of 20 degrees (including 10 degrees or more and 45 degrees or less) as an absolute value with respect to the tire circumferential direction.

A stone that has entered the groove bottom during travel may dig into the groove bottom of the circumferential main groove 21 and damage the radially outer cross belt 143. As a result, deterioration of the tire structure may be accelerated. In particular, a phenomenon in which a stone enters the groove bottom of the circumferential main groove 21 occurs frequently in the circumferential main groove 21 in the center region CE. In this regard, according to the pneumatic tire 1, disposing the supplemental belt 144 on the outer side of the radially outer cross belt 143 in the tire radial direction in the range of the center region CE can be protect the radially outer cross belt 143 from the above-described phenomenon.

In the pneumatic tire 1 of the embodiment, in an unloaded state in which the tire is mounted on a specified rim and inflated to a specified internal pressure, the width W1 of the circumferential reinforcing layer 142 is 50% or more and 70% or less of a cross-sectional width Wp of the carcass layer 13.

The cross-sectional width Wp of the carcass layer 13 is the greatest cross-sectional dimension in the tire width direction of the carcass cords excluding the coating rubber of the carcass layer 13, and is the dimension between both outermost sides in the tire width direction of the carcass cords.

According to the pneumatic tire 1, setting the width W1 of the circumferential reinforcing layer 142 in the range described above allows the internal pressure distribution between the belt layer 14 and the carcass layer 13 in the inflated state to be set in a well-balanced manner, improving the overall tire durability performance.

In the pneumatic tire 1 according to the embodiment, the width W1 of the circumferential reinforcing layer 142 is 65% or more and 80% or less of the width W2 of the radially inner cross belt 141, and the difference between the width W2 of the radially inner cross belt 141 and the width W3 of the radially outer cross belt 143 is 30 mm or less.

According to the pneumatic tire 1, setting the width W1 of the circumferential reinforcing layer 142 in the range described above is effective in increasing the rigidity in the tire circumferential direction. According to the pneumatic tire 1, setting the difference between the width W2 of the radially inner cross belt 141 and the width W3 of the radially outer cross belt 143 in the range described above allows, in the tire radial direction at an end portion of the cross belt composed of the radially inner cross belt 141 and the radially outer cross belt 143, a sufficient rubber layer to be ensured and allows the difference between the widths of the cross belts to be reduced. This can widen a range of the hoop effect of the cross belts and further improves tire durability performance.

In the pneumatic tire 1 according to the embodiment, the radially outer cross belt 143 is disposed adjacent to the tread rubber 15. That is, a belt including a belt cord (for example, the supplemental belt 144) is not present between the radially outer cross belt 143 and the tread rubber 15 on the outer side of the radially outer cross belt 143 in the tire radial direction.

In the structure of a typical heavy duty tire, a small-angle belt having belt cords at a relatively low angle with respect to the tire circumferential direction is disposed as a protective layer on the outer side of the cross belt in the tire radial direction. In this regard, the pneumatic tire 1 including the circumferential reinforcing layer 142 of the belt cord with an angle close to 0 degrees ensures the rigidity in the tire circumferential direction and eliminates a small-angle belt, thus improving the fuel economy performance from the perspective of weight reduction.

In the pneumatic tire 1 according to the embodiment, the radially inner cross belt 141 is disposed adjacent to the carcass layer 13. That is, a belt including a belt cord is not present between the radially inner cross belt 141 and the carcass layer 13 on the inner side of the radially inner cross belt 141 in the tire radial direction.

Figure 4:
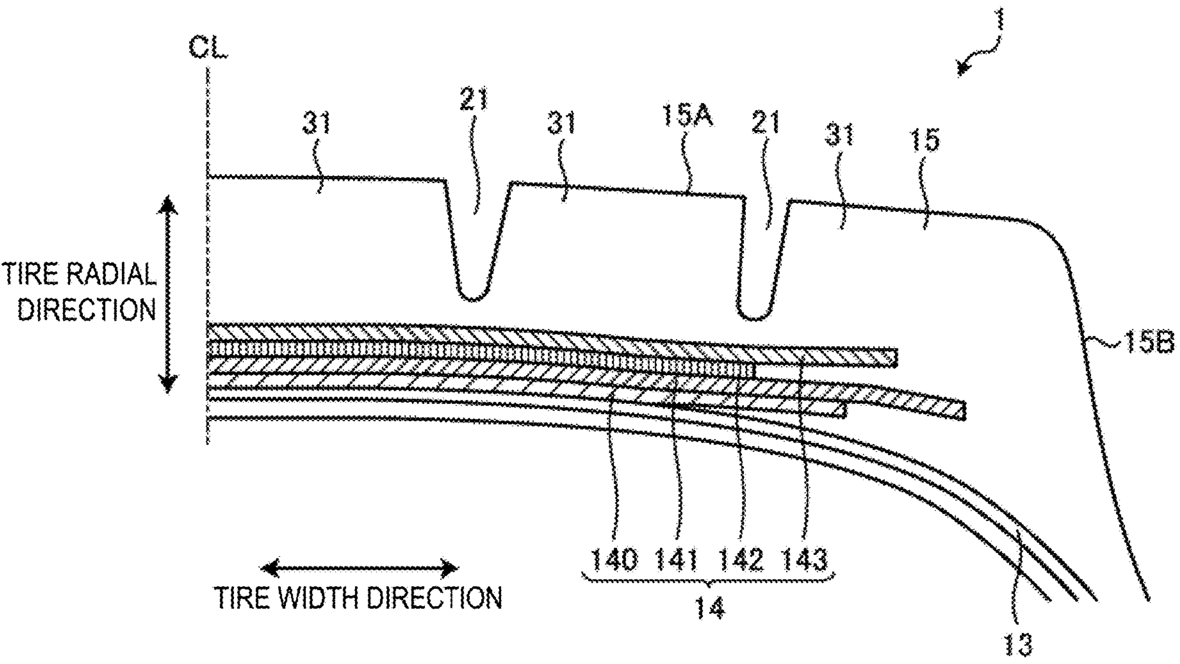
FIG. 4 is a meridian cross-sectional view of another configuration of the pneumatic tire according to an embodiment.

As illustrated in FIG. 4, in the structure of a typical heavy duty tire, a large-angle belt 140 including belt cords having a relatively large angle with respect to the tire circumferential direction (for example, an absolute value of 45 degrees or more and 70 degrees or less with respect to the tire circumferential direction with the same sign as that of the radially inner cross belt 141) is disposed on the inner side in the tire radial direction of the cross belt composed of the radially inner cross belt 141 and the radially outer cross belt 143 to ensure rigidity in the tire width direction. In this regard, according to the pneumatic tire 1, the radially outer cross belt 143 on the outer side of the cross belt in the tire radial direction functions as a large-angle belt, ensuring the rigidity in the tire width direction eliminating the large-angle belt 140, and thus improving the fuel economy performance from the perspective of weight reduction.

In the pneumatic tire 1 according to the embodiment, the circumferential main groove 21 is in the center region CE and the shoulder region SE of the tread surface 15A, and as illustrated in FIG. 1, a distance D between the circumferential main groove 21 in the center region CE and the belt layer 14 and a distance d between the circumferential main groove 21 in the shoulder region SE and the belt layer 14 satisfy the relationship $1.3>D/d>0.8$.

According to the pneumatic tire 1, making the distance from the groove bottom of the circumferential main groove 21 to the belt cord of the belt layer 14 equal at positions of the circumferential main groove 21 in the center region CE and the shoulder region SE reduces strain difference of the tread surface 15A in the tire width direction and equalizes ground contact partial pressure. This can expect further improvement in fuel economy performance.

In the pneumatic tire 1 according to the embodiment, the tread width Wt of the tread surface 15A is 60% or more and 95% or less of the cross-sectional width Wp of the carcass layer 13.

According to the pneumatic tire 1, setting as described above can maintain an appropriate balance of the internal pressure distribution ratio of the carcass layer 13 in the shoulder region SE in the inflated state and expect an improvement in the overall durability performance of the tire in terms of reducing the strain in deflection at the time of ground contact. In the pneumatic tire 1 according to the embodiment, a range in which low rolling resistance can be confirmed is preferably $75\% \le Wt/Wp \le 80\%$. In the case of the pneumatic tire 1 having ultra low-profile with the tread width Wt of 450 mm or more, $75\% \le Wt/Wp \le 85\%$ is preferable.

In the pneumatic tire 1 according to the embodiment, the belt layer 14 is composed of three belt plies of the radially inner cross belt 141, the radially outer cross belt 143, and the circumferential reinforcing layer 142.

According to the pneumatic tire 1, a further improvement in fuel economy performance can be expected by weight reduction due to a reduction in the number of belts.

In the pneumatic tire 1 according to the embodiment, the tread width Wt of the tread surface 15A is 300 mm or less.

In general, a tire including the circumferential reinforcing layer 142 is often applied to a tire having the tread width Wt exceeding 300 mm, which is referred to as a low-profile tire or a wide base. In this regard, the pneumatic tire 1 can be applied to a general-purpose size having the tread width Wt of 300 mm or less with improved durability performance and improved fuel economy performance. In the pneumatic tire 1 according to the embodiment, the tread width Wt of the tread surface 15A is preferably 250 mm or less.

In the present embodiment, as described above, the pneumatic tire 1 has been described as an example of a tire. The pneumatic tire 1 can be inflated with any gas including air and inert gas, such as nitrogen. However, the configuration of the tread pattern of the pneumatic tire 1 described in the present embodiment can also be applied to other tires as desired within the scope apparent to one skilled in the art. Examples of other tires include an airless tire and a solid tire.

EXAMPLES

FIG. 5 and FIG. 6 are tables showing the results of performance tests of pneumatic tires according to the embodiment. Hereinafter, evaluation tests of performance conducted on pneumatic tires of a conventional example, pneumatic tires of comparative examples, and pneumatic tires of examples according to the embodiment will be described. For performance evaluation tests, tests on fuel economy performance and durability performance were performed.

In the evaluation test of low rolling resistance performance, test tires having a tire size of 275/80R22.5 (445/50R22.5 in Example 10) were assembled on standard rims specified by JATMA, and an internal pressure specified by JATMA was applied to the test tires. Then, a drum testing machine having a drum diameter of 1707 mm was used, a multiplicative inverse of a rolling resistance coefficient of the test tire was calculated under conditions of a speed of 80 km/h in accordance with ISO 28580, and the evaluation was performed. The results are expressed as index values and evaluated, with the results of the conventional example being assigned as the reference (100). Larger values indicate superior low rolling resistance performance.

In the evaluation test of low rolling resistance performance, test tires having a tire size of 275/80R22.5 (445/50R22.5 in Example 10) were assembled on standard rims specified by JATMA, and an internal pressure specified by JATMA was applied to the test tires. Then, a cambered drum testing machine having a drum diameter of 1707 mm was used, a speed was set to 81 km/h, an applied load was increased from a specified load by 13% to a maximum of 270% in 15 continuous steps, a running time at which a failure occurs was measured, the reciprocal thereof was calculated, and the evaluation was performed. The evaluation was conducted by using index values with the conventional example being assigned as the reference (100). Larger values indicate more excellent load durability performance.

In the pneumatic tire of the conventional example, the belt layer includes the radially inner cross belt, the radially outer cross belt, and the circumferential reinforcing layer, and the relationship between the widths W1, W2, and W3 satisfies the definition, but the angle of the belt cords of the radially inner cross belt does not satisfy the definition.

In the pneumatic tire of Comparative Example 1, the belt layer does not include the circumferential reinforcing layer. In the pneumatic tire of Comparative Example 2, the belt layer includes the radially inner cross belt, the radially outer cross belt, and the circumferential reinforcing layer, and the relationship between the widths W1, W2, and W3 satisfies the definition, but the angle of the belt cords of the radially outer cross belt does not satisfy the definition. In the pneumatic tire of Comparative Example 3, the belt layer includes the radially inner cross belt, the radially outer cross belt, and the circumferential reinforcing layer, and the angles of the belt cords of the radially outer cross belt and the radially inner cross belt satisfy the definition, but the relationship between the widths W1, W2, and W3 does not satisfy the definition.

In the pneumatic tire of the examples, the belt layer includes the radially inner cross belt, the radially outer cross belt, and the circumferential reinforcing layer, and the angles of the belt cords of the radially outer cross belt and the radially inner cross belt and the relationship between the widths W1, W2, and W3 satisfy the definitions.

As can be seen from the test results, in the pneumatic tires of examples, low rolling resistance performance and durability performance are improved with respect to the conventional example.

The present disclosure includes the following technologies.

Technology 1

A tire, including:

a carcass layer;

a belt layer disposed on an outer side of the carcass layer in a tire radial direction and continuous in a tire circumferential direction;

a tread rubber disposed on an outer side of the belt layer in the tire radial direction;

at least two circumferential main grooves extending in the tire circumferential direction in the tread rubber; and a plurality of land portions defined by the circumferential main grooves in the tread rubber;

the belt layer including a radially inner cross belt including a belt cord having a belt angle having an absolute value of 45 degrees or more with respect to the tire circumferential direction, a radially outer cross belt including a belt cord having a belt angle having an absolute value of 45 degrees or less with respect to the tire circumferential direction with a sign opposite to a sign of the belt angle of the radially inner cross belt and disposed on an outer side of the radially inner cross belt in the tire radial direction, and a circumferential reinforcing layer including a belt cord having a belt angle within a range of ±5 degrees with respect to the tire circumferential direction and disposed between the radially inner cross belt and the radially outer cross belt, and a width W1 of the circumferential reinforcing layer, a width W2 of the radially inner cross belt, and a width W3 of the radially outer cross belt satisfying a relationship W1<W3<W2.

Technology 2

The tire according to Technology 1, wherein the width W1 of the circumferential reinforcing layer is 50% or more and 70% or less of a cross-sectional width Wp of the carcass layer.

Technology 3

The tire according to Technology 1 or 2, wherein the width W1 of the circumferential reinforcing layer is 65% or more and 80% or less of the width W2 of the radially inner cross belt, and a difference between the width W2 of the radially inner cross belt and the width W3 of the radially outer cross belt is 30 mm or less.

Technology 4

The tire according to any one of Technologies 1 to 3, wherein the circumferential main grooves are in a center region and a shoulder region of a tread surface, and a distance D between a circumferential main groove in the center region of the circumferential main grooves and the belt layer and a distance d between a circumferential main groove in the shoulder region of the circumferential main grooves and the belt layer satisfy a relationship 1.3>D/d>0.8.

Technology 5

The tire according to any one of Technologies 1 to 4, wherein a tread width Wt of a tread surface is 60% or more and 95% or less of a cross-sectional width Wp of the carcass layer.

Technology 6

The tire according to any one of Technologies 1 to 5, wherein the radially inner cross belt is disposed adjacent to the carcass layer.

Technology 7

The tire according to any one of Technologies 1 to 6, wherein the radially outer cross belt is disposed adjacent to the tread rubber.

Technology 8

The tire according to any one of Technologies 1 to 7, wherein the belt layer is composed of three belt plies of the radially inner cross belt, the radially outer cross belt, and the circumferential reinforcing layer.

Technology 9

The tire according to any one of Technologies 1 to 6, wherein the circumferential main grooves are in a center region of a tread surface, a supplemental belt is provided on an outer side of the radially outer cross belt in the tire radial direction, and a width W4 of the supplemental belt has a range including a position of a circumferential main groove in the center region of the circumferential main grooves and is less than 90% of the width W3 of the radially outer cross belt.

Technology 10

The tire according to any one of Technologies 1 to 9, wherein a tread width Wt of a tread surface is 300 mm or less.

What is claimed is:

1. A tire, comprising:

a carcass layer;

a belt layer disposed on an outer side of the carcass layer in a tire radial direction and continuous in a tire circumferential direction;

a tread rubber disposed on an outer side of the belt layer in the tire radial direction;

at least two circumferential main grooves extending in the tire circumferential direction in the tread rubber; and a plurality of land portions defined by the circumferential main grooves in the tread rubber;

the belt layer comprising a radially inner belt comprising a belt cord having a belt angle, a radially outer cross belt comprising a belt cord having a belt angle having an absolute value of 45 degrees or less with respect to the tire circumferential direction with a sign opposite to a sign of the belt angle of the radially inner cross belt and disposed on an outer side of the radially inner cross belt in the tire radial direction, and a circumferential reinforcing layer comprising a belt cord having a belt angle within a range of ±5 degrees with respect to the tire circumferential direction and disposed between the radially inner cross belt and the radially outer cross belt, and a width W1 of the circumferential reinforcing layer, a width W2 of the radially inner cross belt, and a width W3 of the radially outer cross belt satisfying a relationship W1<W3<W2, wherein in the belt layer, each belt radially inward in the tire radial direction of the circumferential reinforcing layer includes a belt cord having a belt angle having an absolute value of 46 degrees or more with respect to the tire circumferential direction.

2. The tire according to claim 1, wherein the circumferential main grooves are in a center region of a tread surface, a supplemental belt is provided on an outer side of the radially outer cross belt in the tire radial direction, and a width W4 of the supplemental belt has a range including a position of a circumferential main groove in the center region of the circumferential main grooves and is less than 90% of the width W3 of the radially outer cross belt.

3. The tire according to claim 1, wherein the width W1 of the circumferential reinforcing layer is 50% or more and 70% or less of a cross-sectional width Wp of the carcass layer.

4. The tire according to claim 1, wherein the width W1 of the circumferential reinforcing layer is 65% or more and 80% or less of the width W2 of the radially inner cross belt, and a difference between the width W2 of the radially inner cross belt and the width W3 of the radially outer cross belt is 30 mm or less.

5. The tire according to claim 1, wherein the radially outer cross belt is disposed adjacent to the tread rubber.

6. The tire according to claim 1, wherein the radially inner cross belt is disposed adjacent to the carcass layer.

7. The tire according to claim 1, wherein the circumferential main grooves are in a center region and a shoulder region of a tread surface, and a distance D between a circumferential main groove in the center region of the circumferential main grooves and the belt layer and a distance d between a circumferential main groove in the shoulder region of the circumferential main grooves and the belt layer satisfy a relationship 1.3>D/d>0.8.

8. The tire according to claim 1, wherein a tread width Wt of a tread surface is 60% or more and 95% or less of a cross-sectional width Wp of the carcass layer.

9. The tire according to claim 1, wherein the belt layer is composed of three belt plies of the radially inner cross belt, the radially outer cross belt, and the circumferential reinforcing layer.

10. The tire according to claim 1, wherein a tread width Wt of a tread surface is 300 mm or less.

* * * * *